US012609614B2

(12) United States Patent
Kim et al.

(10) Patent No.: US 12,609,614 B2
(45) Date of Patent: Apr. 21, 2026

(54) DC-DC CONVERTER, VEHICLE INCLUDING CONVERTER, AND CONTROLLING METHOD THEREOF

(71) Applicants: Hyundai Motor Company, Seoul (KR); Kia Corporation, Seoul (KR)

(72) Inventors: Beom Sik Kim, Gwangmyeong-si (KR); Kyu Won Jeong, Hwaseong-si (KR); Tae Woo Kim, Anyang-si (KR); Jae Hun Jeong, Anyang-si (KR); Mun Soo Chung, Uiwang-si (KR); Sang Don Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 232 days.

(21) Appl. No.: 18/217,773

(22) Filed: Jul. 3, 2023

(65) Prior Publication Data

US 2024/0097566 A1 Mar. 21, 2024

(30) Foreign Application Priority Data

Sep. 20, 2022 (KR) ........................ 10-2022-0118721

(51) Int. Cl.
*H02M 3/158* (2006.01)
*B60L 50/75* (2019.01)
*H02P 27/08* (2006.01)

(52) U.S. Cl.
CPC ............. *H02M 3/158* (2013.01); *B60L 50/75* (2019.02); *B60L 2210/10* (2013.01); *B60L 2240/527* (2013.01); *H02P 27/08* (2013.01)

(58) Field of Classification Search
CPC .... H02M 3/158; B60L 50/75; B60L 2210/10; B60L 2240/527; H02P 27/08
See application file for complete search history.

(56) References Cited

U.S. PATENT DOCUMENTS

| | | | |
|---|---|---|---|
| 7,936,083 B2 | 5/2011 | Stancu et al. | |
| 9,457,683 B2 | 10/2016 | Bruyere | |
| (Continued) | | | |

FOREIGN PATENT DOCUMENTS

| | | |
|---|---|---|
| JP | 2012-110071 A | 6/2012 |
| JP | 5434381 B2 | 3/2014 |
| (Continued) | | |

*Primary Examiner* — Rafael O De Leon Domenech
(74) *Attorney, Agent, or Firm* — Morgan, Lewis & Bockius LLP

(57) ABSTRACT

A DC-DC converter, a vehicle including the converter, and a controlling method thereof are provided. The DC-DC converter includes a first capacitor connected to a first DC terminal, a second capacitor connected to a second DC terminal, a plurality of converting circuits each including at least an inductor and a plurality of switching elements, and connected to each other in parallel between the first capacitor and the second capacitor, and a controller configured to control an ON/OFF state of the plurality of switching elements provided of each of the converting circuits. When external power connection with respect to each of the first DC terminal and the second DC terminal is disconnected, the controller is configured to control states of the plurality of switching elements to sequentially provide a plurality of different discharge paths between opposite terminals of the second capacitor via the plurality of converting circuits.

19 Claims, 5 Drawing Sheets

(56) References Cited

U.S. PATENT DOCUMENTS

| | | | |
|---|---|---|---|
| 2010/0038962 A1* | 2/2010 | Komatsu ................. | B60L 58/12 |
| | | | 307/10.1 |
| 2010/0237694 A1* | 9/2010 | Fuma ..................... | B60L 53/14 |
| | | | 307/9.1 |
| 2012/0229061 A1* | 9/2012 | Itoh ..................... | H02M 3/1584 |
| | | | 318/400.3 |
| 2013/0039107 A1* | 2/2013 | Fukuta ................... | H02M 7/48 |
| | | | 363/131 |
| 2019/0291586 A1* | 9/2019 | Kim ...................... | B60L 15/007 |
| 2020/0194996 A1* | 6/2020 | Fisher ................... | H05K 7/2089 |

FOREIGN PATENT DOCUMENTS

| | | |
|---|---|---|
| JP | 2019-054610 A | 4/2019 |
| KR | 10-1199073 B1 | 11/2012 |
| KR | 10-2015-0077733 A | 7/2015 |

* cited by examiner

DC-DC CONVERTER, VEHICLE INCLUDING CONVERTER, AND CONTROLLING METHOD THEREOF

CROSS REFERENCE TO RELATED APPLICATION

The present application claims priority to Korean Patent Application No. 10-2022-0118721, filed on Sep. 20, 2022, the entire contents of which is incorporated herein for all purposes by this reference.

BACKGROUND OF THE PRESENT DISCLOSURE

Field of the Present Disclosure

The present disclosure relates generally to a DC-DC converter, a vehicle including the converter, and a controlling method thereof. More particularly, the present disclosure relates to a DC-DC converter, the converter being configured for forcible discharge of an internal capacitor when external power connection to the converter performing transformation between opposite terminals with different voltages is disconnected, a vehicle including the converter, and a controlling method thereof.

Description of Related Art

Recently, as interest in the environment increases, development of an electrified vehicle having a motor as a driving source is being actively performed. As an example of the electrified vehicle, a fuel cell electric vehicle (FCEV) may be provided.

The fuel cell vehicle may refer to a vehicle that travels by driving an electric motor with power generated through a chemical reaction between hydrogen and oxygen in a fuel cell. To stably supply power to the motor, a high voltage battery may be provided between a motor driving system including the electric motor and the inverter and the fuel cell, and to increase the efficiency and storage capacity, a voltage of the high voltage battery is increasing.

Accordingly, when a voltage of a high voltage battery is significantly higher than a voltage of the fuel cell, a DC-DC converter is disposed between the fuel cell and the high voltage battery to allow power exchange between the fuel cell and the high voltage battery. Here, among opposite terminals of the DC-DC converter, a first terminal connected to the fuel cell with relatively low voltage is a low-voltage side (LS), and a second terminal connected to the high voltage battery with relatively high voltage is a high-voltage side (HS).

The DC-DC converter is generally connected to other power sources via a connector, and the connector may be separated in the event of crash accident or maintenance. Here, when a high voltage is formed in a DC terminal due to charge stored in an internal capacitor, there is a high risk of electric shock because the charge of the internal capacitor cannot be discharged to the outside due to the separation of the connector.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a DC-DC converter, a vehicle including the converter, and a controlling method thereof, the converter being configured for safely discharging an internal capacitor when external connection with respect to opposite DC terminals is disconnected.

The technical problem of the present disclosure is not limited to the above mention, and other problem not mentioned will be clearly understood by those skilled in the art from the description below.

In various aspects of the present disclosure, according to an exemplary embodiment of the present disclosure, a DC-DC converter includes: a first capacitor connected to a first DC terminal; a second capacitor connected to a second DC terminal; a plurality of converting circuits each including at least an inductor and a plurality of switching elements, and connected to each other in parallel between the first capacitor and the second capacitor; and a controller configured to control an ON/OFF state of the plurality of switching elements provided of each of the converting circuits, wherein when external power connection with respect to each of the first DC terminal and the second DC terminal is disconnected, the controller may be configured to control states of the plurality of switching elements to sequentially provide a plurality of different discharge paths between opposite terminals of the second capacitor via the plurality of converting circuits.

The second capacitor may be configured to be forcibly discharged through the sequential provision of the plurality of different discharge paths.

In each of the converting circuits, the plurality of switching elements may include a top switching element and a bottom switching element which may be connected to each other in series between a negative (−) terminal and a positive (+) terminal of the second DC terminal, and the inductor may be connected to a portion between a connection node between the top switching element and the bottom switching element and a positive (+) terminal of the first DC terminal.

To sequentially provide the plurality of different discharge paths, the controller may be configured to change ON/OFF states of the top switching element and the bottom switching element, which may be provided in each of the converting circuits, in a preset order.

In the sequential provision of the plurality of discharge paths, among the plurality of converting circuits, a current direction flowing in an inductor of any one converting circuit and current directions flowing in inductors of remaining converting circuits may be configured to be opposite to each other.

The inductor of the one converting circuit may be sequentially changed during forcible discharge of the second capacitor.

In the sequential provision of the plurality of discharge paths, the controller may be configured to control ON/OFF states of the top switching element and the bottom switching element of the same converting circuit among the plurality of converting circuits opposite to each other.

The controller may be configured to control, among the plurality of converting circuits, an ON/OFF state of a top switching element of one converting circuit and ON/OFF states of top switching elements of remaining converting circuits opposite to each other, and to control an ON/OFF state of a bottom switching element of the one converting circuit and ON/OFF states of bottom switching elements of the remaining converting circuits opposite to each other.

Disconnection of the external power connection may include separation of a first connector connected to the first DC terminal and separation of a second connector connected to the second DC terminal.

The first connector may connect the first DC terminal to a first power device, and the second connector may connect the second DC terminal to a second power device.

The first power device may include a fuel cell, and the second power device may include a high voltage battery.

A vehicle power supply device may include: a DC-DC converter including a first DC terminal and a second DC terminal; a first power device connected to the first DC terminal; and a second power device connected to the second DC terminal, wherein the DC-DC converter may include: a first capacitor connected to a first DC terminal; a second capacitor connected to a second DC terminal; a plurality of converting circuits each including at least an inductor and a plurality of switching elements, and connected to each other in parallel between the first capacitor and the second capacitor; and a controller configured to control an ON/OFF state of the plurality of switching elements provided of each of the converting circuits, wherein when power connection between the first DC terminal and the first power device and power connection between the second DC terminal and the second power device are respectively disconnected, the controller is configured to control a state of the plurality of switching elements to sequentially provide a plurality of different discharge paths between opposite terminals of the second capacitor via the plurality of converting circuits.

The second capacitor may be configured to be forcibly discharged through the sequential provision of the plurality of different discharge paths.

In each of the converting circuits, the plurality of switching elements may include a top switching element and a bottom switching element which may be connected to each other in series between a negative (−) terminal and a positive (+) terminal of the second DC terminal, and the inductor may be connected to a portion between a connection node between the top switching element and the bottom switching element and a positive terminal of the first DC terminal.

To sequentially provide the plurality of different discharge paths, the controller may be configured to change ON/OFF states of the top switching element and the bottom switching element, which may be provided in each of the converting circuits, into a preset order.

In the sequential provision of the plurality of discharge paths, among the plurality of converting circuits, a current direction flowing in an inductor of any one converting circuit and current directions flowing in inductors of remaining the converting circuits may be configured to be opposite to each other.

According to the exemplary embodiment of the present disclosure, when external connection with respect to the opposite DC terminals is disconnected, the internal discharge paths are provided by switching the internal switching elements so that the high side capacitor may be safely discharged.

The plurality of different discharge paths is sequentially provided, so that overload of the internal switching elements during forcible discharge may be prevented.

The effect of the present disclosure is not limited to the above mention, and other effects not mentioned will be clearly understood by those skilled in the art from the description below.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
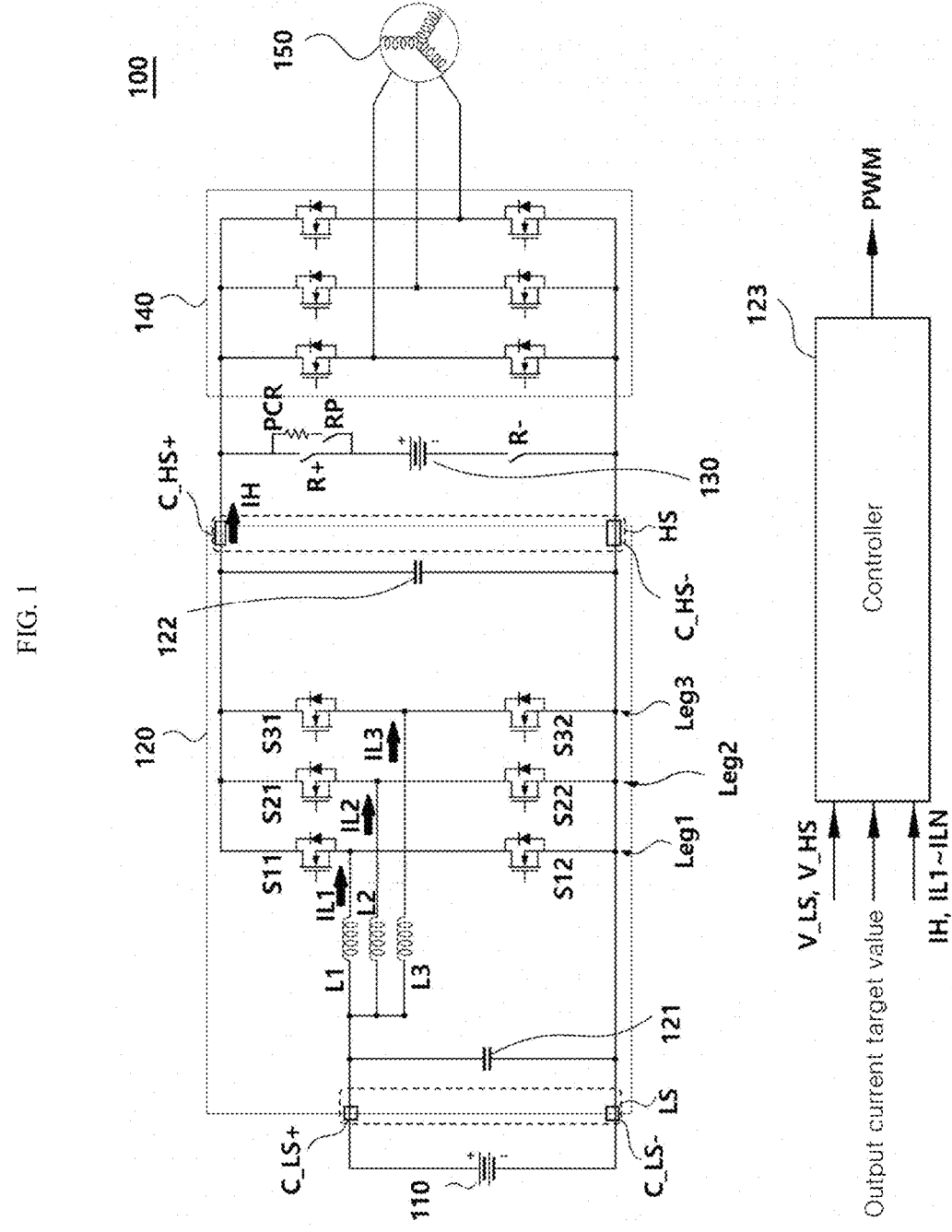
FIG. 1 is a view showing an example of configuration of a power electronic system of a fuel cell vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinbelow, an exemplary embodiment described in the specification will be described in detail with reference to accompanying drawings, and regardless of the reference numerals, the same reference numerals will refer to the same or like parts, and redundant descriptions thereof will be omitted. The suffixes "module and "part" for the components used in the following description are provided or mixed in consideration of only the ease of writing the specification, and do not have distinct meanings or roles by themselves. Furthermore, if it is decided that the detailed description of known function or configuration related to the present disclosure makes the subject matter of the present disclosure unclear, the detailed description is omitted. Furthermore, the accompanying drawings are only for understanding of the exemplary embodiments of the present disclosure, and the technical ideas included in the specification are not limited by the accompanying drawings, and those skilled in the art will appreciate that various modifications, additions, and substitutions are possible, without departing from the scope and spirit of the present disclosure as included in the accompanying claims.

It will be understood that, although the terms first and/or second, etc. may be used herein to describe various elements, these elements should not be limited by these terms. These terms are only used to distinguish one element, from another element.

It is to be understood that when one element is referred to as being "connected to" or "coupled to" another element, it may be directly connected to or directly coupled to another element or be connected to or coupled to another element, including the other element intervening therebetween. On the other hand, it is to be understood that when one element is referred to as being "directly connected to" or "directly coupled to" another element, it may be connected to or coupled to another element without the other element intervening therebetween.

Singular forms are intended to include plural forms unless the context clearly indicates otherwise.

It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Furthermore, a unit or a control unit included in names such as a motor control unit (MCU), a hybrid control unit (HCU), etc. is only a widely used term for a controller that is configured to control a specific function of a vehicle, and does not mean a generic function unit. For example, the controller may include a communication device communicating with other controllers or a sensor to control the function in charge, a memory storing an operation system or a logic command and input/output information, and at least one process performing determination, calculation, and decision necessary for controlling the function in charge.

Following embodiments are described on the assumption that the exemplary embodiments are applied to a hydrogen fuel cell vehicle, but the description is for convenience of explanation, and it is obvious to those skilled in the art that the exemplary embodiments may be applied to a vehicle provided with two batteries including different normal voltage ranges in addition to the hydrogen fuel cell vehicle.

FIG. 1 is a view showing an example of configuration of a power electronic system of a fuel cell vehicle according to an exemplary embodiment of the present disclosure.

Referring to FIG. 1, according to the exemplary embodiment of the present disclosure, a fuel cell vehicle 100 may include a fuel cell 110, a DC-DC converter (FDC: Fuel cell DC-DC Converter) 120 of which a first end is connected to the fuel cell 110, a high voltage battery 130 connected to a second end of the FDC 120, an inverter 140 of which a DC terminal is connected to the second end of the FDC 120, and a motor 150 connected to an AC terminal of the inverter 140.

The fuel cell 110 may output electric power through a chemical reaction of hydrogen and oxygen. For example, the fuel cell 110 may assume the form of a polymer electrolyte membrane fuel cell (PEMFC: Polymer Electrolyte Membrane Fuel Cell, Proton Exchange Membrane Fuel Cell), and the form is only an example and is not limited thereto.

The FDC 120 includes two DC terminals, i.e., a first terminal electrically connected to the fuel cell 110 and a second terminal electrically connected to the high voltage battery 130. The FDC 120 is configured to convert or transform a voltage of power input from the first terminal to correspond to a voltage at the second terminal and to output the transformed voltage to the second terminal. To the present end, the FDC 120 may include a first capacitor 121 provided to stably maintain the voltage at the first terminal, a second capacitor 122 provided to stably maintain the voltage at the second terminal, and a plurality of pairs of inductor-leg provided to generate boost topology for transformation, and a converter controller 123.

Here, assuming that a normal voltage range of the fuel cell 110 is relatively less than a normal voltage range of the high voltage battery 130, the first terminal may be referred to as a low side LS, and the second terminal may be referred to as a high side HS. The first capacitor 121 may be connected to a negative (−) terminal and a positive (+) terminal of the low side LS while being located therebetween, and the second capacitor 122 may be connected to a negative (−) terminal and a positive (+) terminal of the high side HS while being located therebetween. Here, the first capacitor 121 may be referred to as a 'low side capacitor', and the second capacitor 122 may be referred to as a 'high side capacitor'.

Furthermore, the plurality (here, 3 pairs of inductor-leg are provided) of pairs of inductor-leg may be connected to each other in parallel between the low side capacitor 121 and the high side capacitor 122. A first terminal of each of N inductors L1, L2, and L3 may be connected to the positive (+) terminal of the low side LS, and a second terminal thereof may be connected to a corresponding leg among a plurality of legs Leg1, Leg2, and Leg3, forming a pair of inductor-leg. Hereinafter, each of the inductor-leg pairs may be referred to as a 'converting circuit'.

Each leg Leg1, Leg2, Leg3 includes two switching elements connected to each other in series between opposite terminals of the high side capacitor 122, and a connection node of the two switching elements may be connected to the second terminal of the inductor forming the pair of inductor-leg. For example, the first leg Leg1 includes a first switching element S11 and a second switching element S12 connected to each other in series between the opposite terminals of the high side capacitor 122. A connection node of the two switching elements S11 and S12 may be connected to a second terminal of the first inductor L1, forming a first pair of inductor-leg L1-Leg1. The first switching element S11 may be referred to as a 'top switching element', and the second switching element S12 may be referred to as a 'bottom switching element'.

Furthermore, the second leg Leg2 includes a third switching element S21 and a fourth switching element S22 connected to each other in series between the opposite terminals of the high side capacitor 122. A connection node of the two switching elements S21 and S22 may be connected to a second terminal of the second inductor L2, forming a second pair of inductor-leg L2-Leg2. The third switching element S21 may be referred to as the 'top switching element', and the fourth switching element S22 may be referred to as the 'bottom switching element'.

Furthermore, the third leg Leg3 includes a fifth switching element S31 and a sixth switching element S32 connected to each other in series between the opposite terminals of the high side capacitor 122. A connection node of the two switching elements S31 and S32 may be connected to a second terminal of the third inductor L3, forming a third pair of inductor-leg L3-Leg3. Also, the fifth switching element S31 may be referred to as the 'top switching element', and the sixth switching element S32 may be referred to as the 'bottom switching element'.

Each of the switching elements may be implemented into a power semiconductor device configured for high-power fast switching, for example, an insulated gate bipolar transistor (IGBT), but is not necessarily limited thereto.

Furthermore, the converter controller 123 may control, in the basis of low side current IL1, IL2, IL3, high side current IH, voltage V_LS between the opposite terminals of the low side capacitor 121, voltage V_HS between opposite terminals of the high side capacitor 122, and output current target value, a state of the switching element S11, S12, S21, S22, S31, S32 forming each leg Leg1, Leg2, Leg3 through pulse width modulation PWM. To the present end, the FDC 120 may include a current sensor and a voltage sensor to measure each current and voltage. Meanwhile, the output current target value may be information transmitted from a fuel cell control unit (FCU) to be described later.

The high voltage battery 130 may be connected to the positive (+) terminal and the negative (−) terminal of the high side HS while being located therebetween via a plurality of switches, for example, a plurality of relays R+, R−, and RP. A cathode (−) of the high voltage battery 130 may be selectively connectable to the negative (−) terminal of the high side HS via the negative relay R−, and an anode (+) thereof may be selectively connectable to the positive (+) terminal of the high side HS via a positive relay R+ or the pre-charge relay RP. The pre-charge relay RP may be connected to a pre-charge resistor PCR in series. However, when the negative relay R− and the positive relay R+ are turned on at the same time, large inrush current instantaneously occurs for initial charging of the high side capacitor 122, causing damage to the relays and the capacitors. Therefore, the pre-charge relay RP is turned on first instead of the positive relay R+ and the negative relay R− is turned on, the Inrush current is reduced by the pre-charge resistor PCR connected to the pre-charge relay RP in series, so that the damages to the relays and capacitors may be prevented. When the high side capacitor 122 is charged above a predetermined voltage, the positive relay R+ is turned on and the pre-charge relay RP may be turned off. According to implementation, each relay R+, R−, RP may be replaced with different types of switches, for example, with a power semiconductor.

Meanwhile, the fuel cell 110 may be electrically connected to the low side LS of the FDC 120 via a positive (+) connector C_LS+ and a negative (−) connector C_LS−, and the high voltage battery 130 may be electrically connected to the high side thereof via a positive (+) connector C_HS+ and a negative (−) connector C_HS−.

The inverter 140 may convert DC power of the high voltage battery 130 into multi-phase AC power to drive the motor 150, or may convert AC power generated from the motor 150 into DC power to transmit the DC power to the high voltage battery 130. Therefore, the inverter 140 may include the plurality of legs respectively corresponding to multi-phases. It is obvious to those skilled in the art that the multi-phase motor and the inverter to drive the motor may be implemented in various configurations, and the detailed description thereof will be described.

Based on the configuration of a power electronic system described with reference to FIG. 1, a control system of the fuel cell vehicle will be described below with reference to FIG. 2.

Figure 2:
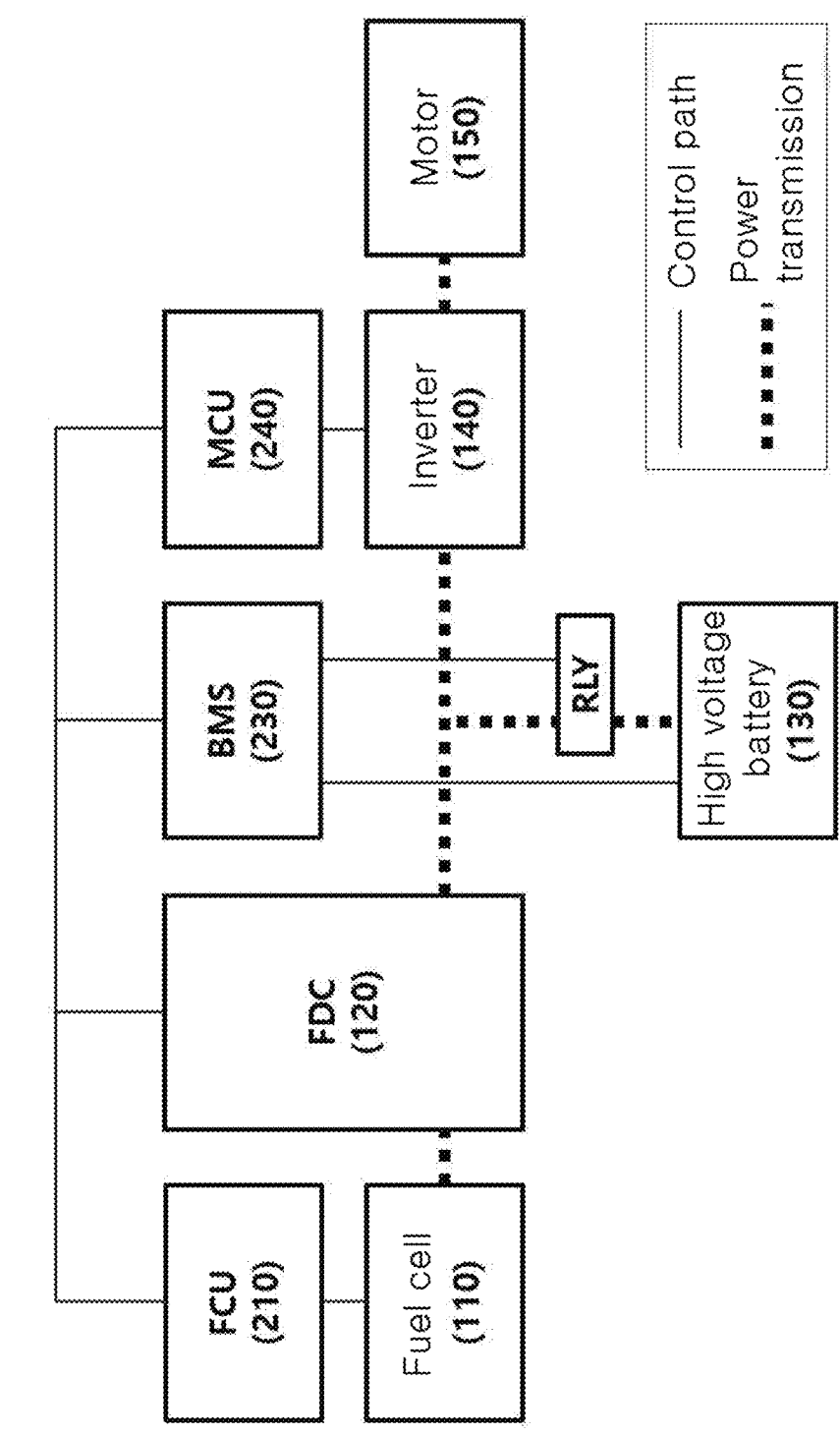
FIG. 2 is a view showing an example of configuration of a control system of the fuel cell vehicle according to an exemplary embodiment of the present disclosure.

FIG. 2 is a view showing a control system of the fuel cell vehicle according to the exemplary embodiment of the present disclosure with the power electronic system. In FIG. 2, a closed line connecting one element to another element marks a control signal transmission path, and a dotted line marks a power transmission path. Furthermore, in describing FIG. 2, the power transmission path is equal to the description referring to FIG. 1 and the repeated description thereof will be described.

Referring to FIG. 2, a fuel cell control unit (FCU) 210 is configured to control the fuel cell 110, and the converter controller 123 may perform control of the FDC 120. Furthermore, a battery management system (BMS) 230 may control an ON/OFF state of the relay (RLY: R+, R−, RP), and may manage a state of the high voltage battery 130.

Furthermore, a motor control unit (MCU) 240 may control a gate drive unit by a PWM type control signal based on a motor angle, phase voltage, phase current, demand torque, etc. of the motor 150, and accordingly, the gate drive unit may control the inverter 140 driving the motor 150.

Each of the control subject 123, 210, 230, and 240 may exchange information or commands, etc. necessary for control through communication according to a predetermined vehicle communication protocol, for example, Controller Area Network (CAN) communication.

Based on the configuration of the fuel cell vehicle described above, a forcible discharge method of the inside capacitor when external power connection of the FDC 120 is disconnected will be described, referring to FIG. 3, FIG. 4, and FIG. 5.

Figure 3:
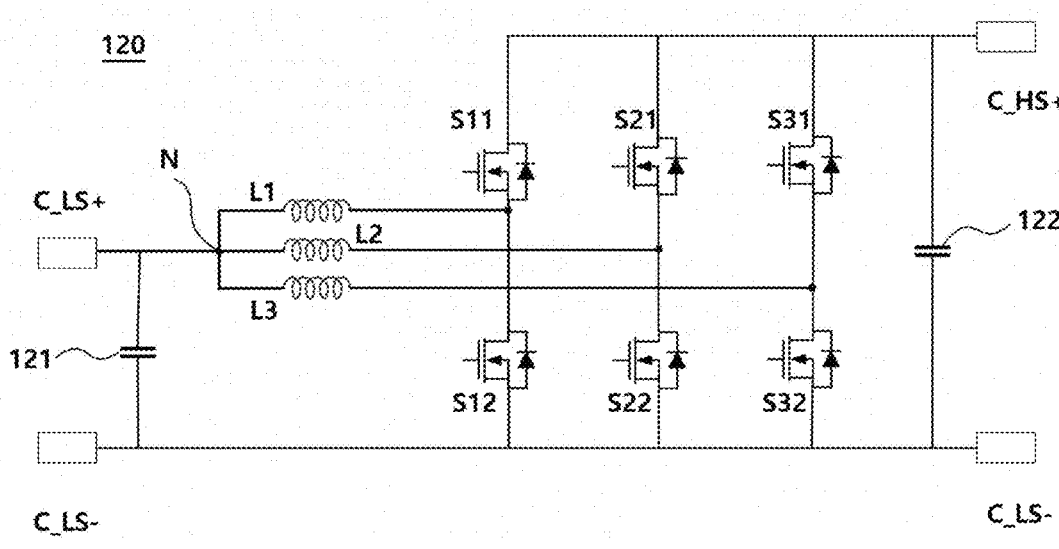
FIG. 3 is a view showing a disconnected state of external connection of opposite DC terminals in a DC-DC converter according to an exemplary embodiment of the present disclosure.

FIG. 3 is a view showing a disconnected state of external connection of opposite DC terminals in a DC-DC converter according to an exemplary embodiment of the present disclosure.

Referring to FIG. 3, it is shown that the connectors C_HS+, C_HS−, C_LS+, and C_LS—of the two DC terminals HS and LS of the FDC 120 are separated and the external power connection is disconnected by an impact of a collision accident or an operator during maintenance.

Before the above state (before separation of connector), when the FDC 120 is normally operated, the voltage V_HS between the opposite terminals of the second capacitor 122 is formed high and a driver or a maintenance operator may be at risk of exposure thereto situationally. However, the second capacitor 122 cannot be discharged by leaking current outward due to the connector separation. However, according to the exemplary embodiment of the present disclosure, it is provided that when the external power connection of the FDC 120 is disconnected, an internal discharge path is formed by switching the internal switching elements S11, S12, S21, S22, S31, and S32 to forcibly discharge the second capacitor 122.

For example, the discharge path is formed between the opposite terminals of the second capacitor 122, and may include the node N disconnected to each inductor. Therefore, in addition to driving of the internal switching elements S11, S12, S21, S22, S31, and S32, the discharge path passes through the inductors L1, L2, and L3 so that electric charge charged in the second capacitor 122 is consumed and the forcible discharge is possible.

For example, according to a switching pattern, a plurality of different discharge paths may be provided, and the plurality of discharge paths may be sequentially provided.

For example, the plurality of discharge paths may be configured so that based on the node N, a current direction flowing along any one inductor among the plurality of inductors L1, L2, and L3 and current directions flowing along remaining inductors are opposite to each other. To the present end, the top switching element and the bottom switching element of the same leg may be controlled so that ON/OFF states thereof are opposite to each other. Furthermore, among converting circuits, a top switching element of any one converting circuit and top switching elements of remaining converting circuits may have opposite states to each other, and a bottom switching element of the any one converting circuit and bottom switching elements of the remaining converting circuits may have opposite states to each other.

The specific discharge paths and the switching control form to form the paths will be described with reference to FIGS. 4A and 4C.

Figure 4A:
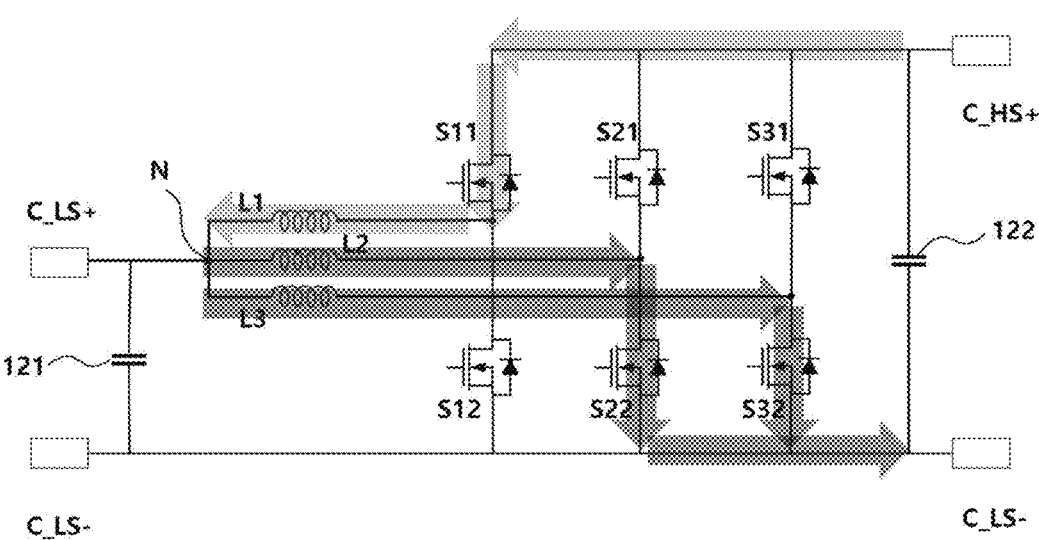
FIG. 4A, FIG. 4B and FIG. 4C are views respectively showing examples of different discharge paths provided via the DC-DC converter according to an exemplary embodiment of the present disclosure.
Figure 4B:
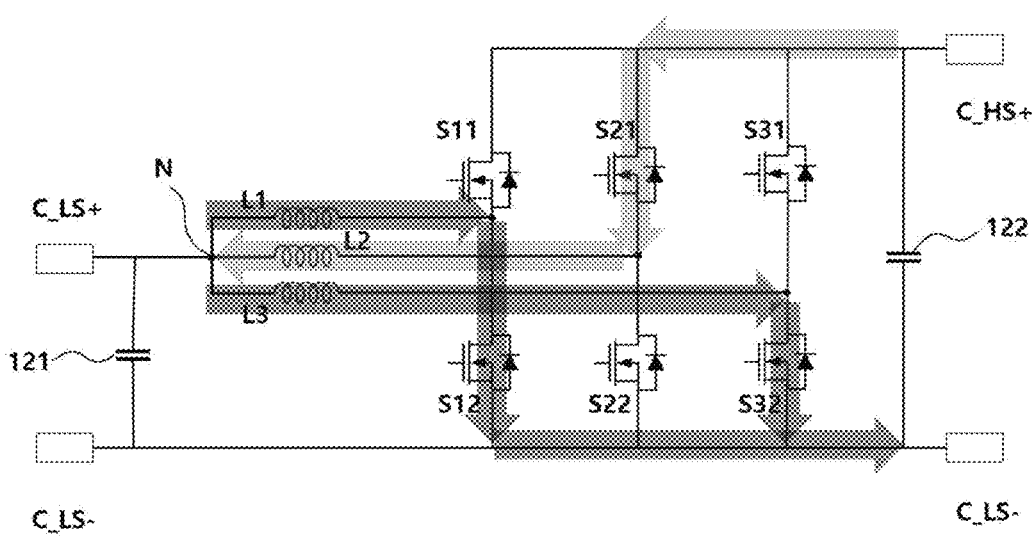
Figure 4C:
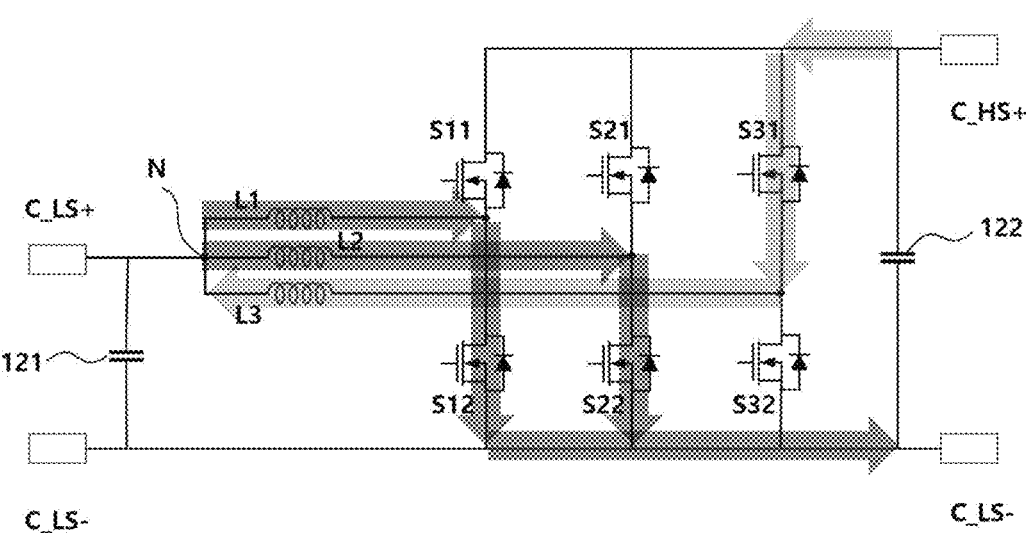

FIG. 4A, FIG. 4B and FIG. 4C are views respectively showing examples of different discharge paths provided via the DC-DC converter according to an exemplary embodiment of the present disclosure.

First, referring to FIG. 4A, there is a view showing a first discharge path according to a first switching state. In the first discharge path, based on the node N, a current direction of the first inductor L1 and current directions of the second and third inductors L2 and L3 are opposite to each other. To provide the discharge path, the first switching element S11, the fourth switching element S22, and the sixth switching element S32 may be turned on, and the second switching element S12, the third switching element S21, and the fifth switching element S31 may be turned off. In other words, in order of the top switching element—the bottom switching element, the first leg to the third leg have switching states of on-off, off-on, and off-on, respectively. Therefore, in the same leg, switching states of the top switching element and the bottom switching element are opposite to each other, and the top switching element S11 included in the leg connected to the first inductor L1 becomes opposite to switching states of the top switching elements S21 and S31 included in the remaining legs in switching state, and the bottom switching element S12 included in the leg connected to the first inductor L1 becomes opposite to the bottom switching elements S22 and S32 included in the remaining legs in switching states.

Next, referring to FIG. 4B, there is a view showing a second discharge path according to a second switching state. In the second discharge path, based on the node N, a current direction of the second inductor L2 and current directions of the first and third inductors L1 and L3 are opposite to each other. To provide the discharge path, the second switching element S12, the third switching element S21, and the sixth switching element S32 may be turned on, and the first switching element S11, the fourth switching element S22, and the fifth switching element S31 may be turned off. In other words, in order of the top switching element—the bottom switching element, the first leg to the third leg have switching states of off-on, on-off, and off-on, respectively. Therefore, in the same leg, switching states of the top switching element and the bottom switching element are opposite to each other, and the top switching element S21 included in the leg connected to the second inductor L2 becomes opposite to switching states of the top switching elements S11 and S31 included in the remaining legs in switching state, and the bottom switching element S22 included in the leg connected to the second inductor L2 becomes opposite to the bottom switching elements S12 and S32 included in the remaining legs in switching states.

Next, referring to FIG. 4C, there is a view showing a third discharge path according to a third switching state. In the second discharge path, based on the node N, a current direction of the third inductor L3 and current directions of the first and second inductors L1 and L2 are opposite to each other. To provide the discharge path, the second switching element S12, the fourth switching element S22, and the fifth switching element S31 may be turned on, and the first switching element S11, the third switching element S21, and the sixth switching element S32 may be turned off. In other words, in order of the top switching element—the bottom switching element, the first leg to the third leg have switching states of off-on, off-on, and on-off, respectively. Therefore, in the same leg, switching states of the top switching element and the bottom switching element are opposite to each other, and the top switching element S31 included in the leg connected to the third inductor L3 becomes opposite to switching states of the top switching elements S11 and S21 included in the remaining legs in switching state, and the bottom switching element S32 included in the leg connected to the third inductor L3 becomes opposite to the bottom switching elements S12 and S22 included in the remaining legs in switching states.

The converter controller 123 may provide the above-described first, second, and third discharge paths in the preset order, and a provision time (holding time in switching state) of each discharge path may be constant for each discharge path or be different. For example, the holding time in each switching state may be preset equally corresponding durability specifications of the switching elements, and may be preset differently based on temperature of each of the switching elements and cumulative operating time of each of the switching elements. However, the exemplary embodiment of the present disclosure is illustrative and it is obvious to those skilled in the art that holding time for each switching state may be variously preset within a range of preventing overload of the switching elements.

Figure 5:
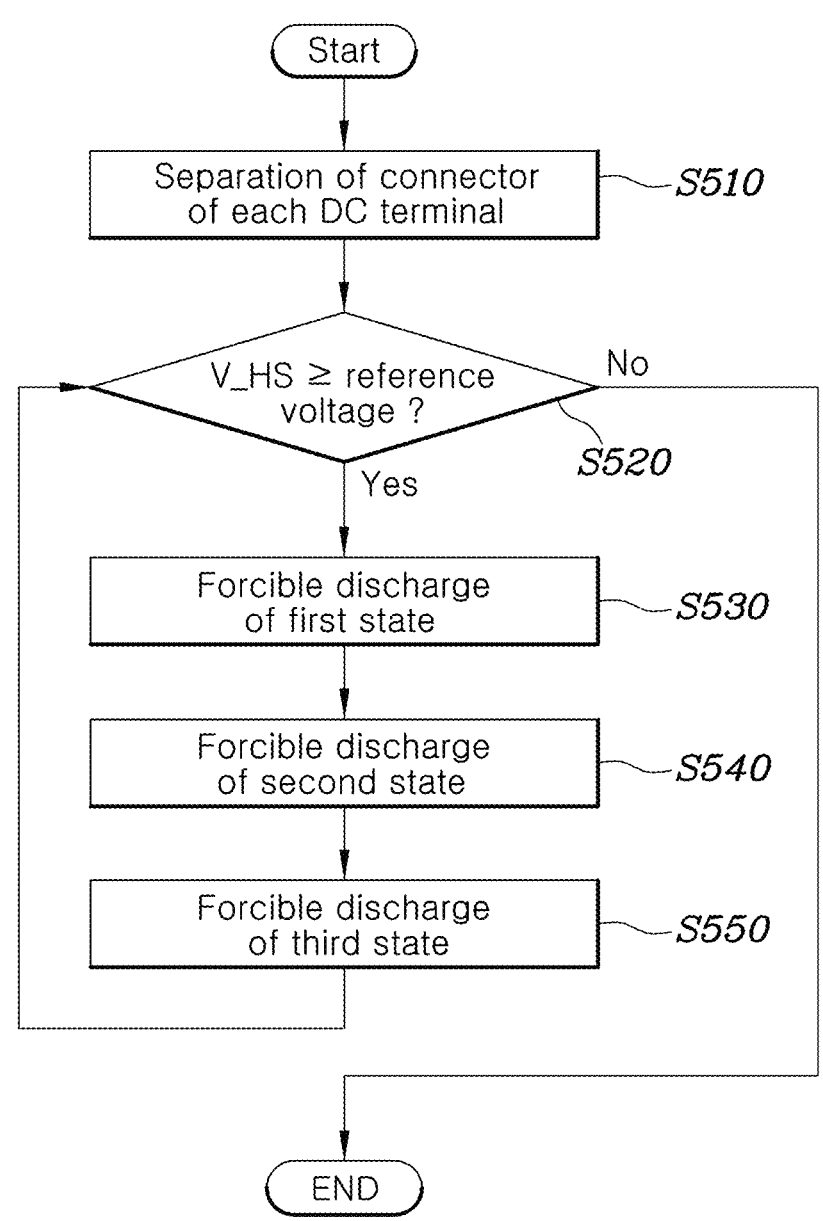
FIG. 5 is a flowchart showing an example of a control process of the DC-DC converter according to an exemplary embodiment of the present disclosure.

According to the above-described embodiment, a forcible discharge control through provision of the plurality of discharge paths will be summarized in a flowchart as shown in FIG. 5.

FIG. 5 is a flowchart showing an example of a control process of the DC-DC converter according to an exemplary embodiment of the present disclosure.

Referring to FIG. 5, the external power connection with respect to the FDC 120 may be disconnected to the connector coupled to each of the LS DC terminal and the HS DC terminal of the FDC 120 is separated, etc., S510. As described above, the separation of the connector of each DC terminal may be separation by an external impact or separation by a maintenance worker. The converter controller 123 may detect the disconnection of the external power connection in various methods. For example, the converter controller 123 may be configured to determine that the connector is separated, by being notified of disconnection of the connector of the low side LS from the FCU 210 or of disconnection of the connector of the high side HS from the BMS 230. For another example, the converter controller 123 may be configured to determine the separation of the connector based on change of the low-voltage side V_LS and the high-voltage side V_HS. For another example, the converter controller 123 may be configured to determine separation of the connector based on an interlock method widely applied to detect whether or not a connector is coupled to an electrified vehicle (method of providing a conductor on a connector so that two pins provided in an inlet are short-circuited to each other in coupling of the connector). However, in addition to the above example, when the converter controller 123 detects separation of connection of each DC terminal, any method may be applied.

When disconnection between each DC terminal of the FDC 120 and the external power is detected, the converter controller 123 may be configured to determine whether or not a voltage of the positive terminal of the second capacitor 122, i.e., the high-voltage side V_HS is equal to or greater than a predetermined reference voltage, S520. Herein, the reference voltage may be preset at a low voltage with a low risk of electric shock, e.g., at 60V, which is illustrative and the reference voltage is not necessarily limited thereto.

However, when the high-voltage side V_HS is equal to or higher than the reference voltage (Yes in S520), the converter controller 123 is configured to control the switching elements S11, S12, S21, S22, S31, and S32 of the converting circuit into a first state, as described above with reference to FIG. 4A, to provide the first discharge path, so that the second capacitor 122 may be forcibly discharged, S530.

Next, as described above with reference to FIG. 4B, the converter controller 123 may control the switching elements S11, S12, S21, S22, S31, and S32 of the converting circuit into a second state to provide the second discharge path, S540. Furthermore, as described above with reference to FIG. 4C, the converter controller 123 may control the switching elements S11, S12, S21, S22, S31, and S32 of the converting circuit into a third state to provide the third discharge path, S550.

After the different discharge paths are sequentially provided, the converter controller 123 may compare again the high-voltage side V_HS to the reference voltage, S520. Therefore, the sequential provision of the above-described different discharge paths may be repeatedly performed until the high-voltage side V_HS is less than the reference voltage (No in S520).

Meanwhile, in FIG. 5, the provision of the discharge paths in order of the first discharge path→the second discharge path→the third discharge path is described, but the order of providing the discharge paths may be different therefrom. Furthermore, it is described that comparison between the high-voltage side V_HS and the reference voltage is re-performed after the sequential provision of the plurality of discharge paths is completed, but the comparison process may be performed in real time, or may be performed for each time where one discharge path is switched into another discharge path.

According to the above-described embodiments of the present disclosure, when connection between the two DC terminals and the external power is disconnected, the internal discharge paths are provided through switching of the switching elements, so that the high side capacitor may be safely discharged. The plurality of different discharge paths is sequentially provided, so that overload of the internal switching elements during forcible discharge may be prevented.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A DC-DC converter comprising:
a first capacitor connected to a first DC terminal;
a second capacitor connected to a second DC terminal;
a first power source connected to the first DC terminal;
a second power source connected to the second DC terminal;
a plurality of converting circuits each including at least an inductor and a plurality of switching elements, and connected to each other in parallel between the first capacitor and the second capacitor; and
a controller configured to control an ON/OFF state of the plurality of switching elements provided of each of the converting circuits,
wherein, based on the controller's determining that power connection between the first DC terminal and the first power source and power connection between the second DC terminal and the second power source are respectively disconnected, the controller is configured to control states of the plurality of switching elements to sequentially provide a plurality of different discharge paths between opposite terminals of the second capacitor via the plurality of converting circuits.

2. The DC-DC converter of claim 1, wherein the second capacitor is configured to be forcibly discharged through the sequential provision of the plurality of different discharge paths.

3. The DC-DC converter of claim 1,
wherein in each of the converting circuits, the plurality of switching elements includes a top switching element and a bottom switching element that are connected to each other in series between a negative (−) terminal and a positive (+) terminal of the second DC terminal, and
wherein the at least one inductor is connected to a portion between a connection node between the top switching element and the bottom switching element and a positive (+) terminal of the first DC terminal.

4. The DC-DC converter of claim 3, wherein, to sequentially provide the plurality of different discharge paths, the controller is configured to change ON/OFF states of the top switching element and the bottom switching element, which are provided in each of the converting circuits, into a preset order.

5. The DC-DC converter of claim 3, wherein, in the sequential provision of the plurality of discharge paths, among the plurality of converting circuits, a current direction flowing in an inductor of one converting circuit among the at least one inductor and current directions flowing in inductors of remaining converting circuits among the at least one inductor are configured to be opposite to each other.

6. The DC-DC converter of claim 5, wherein the inductor of the one converting circuit is sequentially changed during forcible discharge of the second capacitor.

7. The DC-DC converter of claim 3, wherein in the sequential provision of the plurality of discharge paths, the controller is configured to control ON/OFF states of the top switching element and the bottom switching element of a same converting circuit among the plurality of converting circuits opposite to each other.

8. The DC-DC converter of claim 7, wherein the controller is configured:
to control, among the plurality of converting circuits, an ON/OFF state of a top switching element of one converting circuit and ON/OFF states of top switching elements of remaining converting circuits opposite to each other, and
to control an ON/OFF state of a bottom switching element of the one converting circuit and ON/OFF states of bottom switching elements of the remaining converting circuits opposite to each other.

9. The DC-DC converter of claim 1, wherein the disconnection of the the power connection includes separation of a first connector connected to the first DC terminal and separation of a second connector connected to the second DC terminal.

10. The DC-DC converter of claim 9,
wherein the first connector connects the first DC terminal to the first power source, and
wherein the second connector connects the second DC terminal to the second power source.

11. The DC-DC converter of claim 10,
wherein the first power source includes a fuel cell, and
wherein the second power source includes a battery.

12. A vehicle power supply apparatus comprising:
a DC-DC converter including a first DC terminal and a second DC terminal;
a first DC power device connected to the first DC terminal; and
a second DC power device connected to the second DC terminal,
wherein the DC-DC converter includes:
a first capacitor connected to the first DC terminal;
a second capacitor connected to the second DC terminal;
a plurality of converting circuits each including at least an inductor and a plurality of switching elements, and connected to each other in parallel between the first capacitor and the second capacitor; and
a controller configured to control an ON/OFF state of the plurality of switching elements provided of each of the converting circuits,
wherein based on the controller's determining that power connection between the first DC terminal and the first DC power device and power connection between the second DC terminal and the second DC power device are respectively disconnected, the controller is configured to control a state of the plurality of switching elements to sequentially provide a plurality of different discharge paths between opposite terminals of the second capacitor via the plurality of converting circuits.

13. The vehicle power supply apparatus of claim 12, wherein the second capacitor is configured to be forcibly discharged through the sequential provision of the plurality of different discharge paths.

14. The vehicle power supply apparatus of claim 12,
wherein in each of the converting circuits, the plurality of switching elements includes a top switching element and a bottom switching element that are connected to each other in series between a negative (−) terminal and a positive (+) terminal of the second DC terminal, and wherein the at least an inductor is connected to a portion between a connection node between the top switching element and the bottom switching element and a positive terminal of the first DC terminal.

15. The vehicle power supply apparatus of claim 14, wherein to sequentially provide the plurality of different discharge paths, the controller is configured to change ON/OFF states of the top switching element and the bottom switching element, which are provided in each of the converting circuits, into a preset order.

16. The vehicle power supply apparatus of claim 14, wherein in the sequential provision of the plurality of discharge paths, among the plurality of converting circuits, a current direction flowing in an inductor of one converting circuit among the at least one inductor and current directions flowing in inductors of remaining converting circuits among the at least one inductor are configured to be opposite to each other.

17. The vehicle power supply apparatus of claim 14, further includes a negative relay, a positive relay, and a pre-charge relay wherein a cathode (−) of the second DC power device is selectively connectable to the negative (−) terminal of the second DC terminal via the negative relay R−, wherein an anode (+) of the second DC power device is selectively connectable to the positive (+) terminal of the second DC terminal via the positive relay R+ or the pre-charge relay RP.

18. The vehicle power supply apparatus of claim 17, further includes a pre-charge resistor connected to the pre-charge relay in series, wherein the pre-charge relay is configured to be turned on first instead of the positive relay R+ and the negative relay R− is turned on.

19. The vehicle power supply apparatus of claim 17, wherein when the second capacitor is charged above a predetermined voltage, the positive relay R+ is turned on.

* * * * *